(12) United States Patent
Friedmann et al.

(10) Patent No.: US 6,186,917 B1
(45) Date of Patent: Feb. 13, 2001

(54) VARIABLE SPEED TRANSMISSION

(75) Inventors: Oswald Friedmann, Lichtenau; Bernhard Walter, Oberkirch, both of (DE)

(73) Assignee: LuK Getriebe-Systeme GmbH, Buhl/Baden (DE)

(*) Notice: Under 35 U.S.C. 154(b), the term of this patent shall be extended for 0 days.

(21) Appl. No.: 09/198,712

(22) Filed: Nov. 24, 1998

(30) Foreign Application Priority Data

Nov. 29, 1997 (DE) .............................................. 197 53 122

(51) Int. Cl.$^7$ .................................................. F16H 61/00
(52) U.S. Cl. ............................................................. 474/18
(58) Field of Search ................................ 474/18, 28, 69, 474/70, 8, 11, 12, 17; 277/390, 394, 395, 402, 549, 552, 438

(56) References Cited

U.S. PATENT DOCUMENTS

| | | | |
|---|---|---|---|
| 3,195,901 | * | 7/1965 | Mercier ................................ 277/438 |
| 3,563,557 | * | 2/1971 | Doutt ................................... 277/438 |
| 3,563,558 | * | 2/1971 | Doutt ................................... 277/438 |
| 3,572,727 | * | 3/1971 | Greiner ................................ 277/395 |
| 3,576,153 | * | 4/1971 | Doutt ................................... 277/438 |
| 5,046,991 |   | 9/1991 | Friedmann ........................... 474/18 |
| 5,295,915 |   | 3/1994 | Friedmann ........................... 474/18 |
| 5,642,889 | * | 7/1997 | Pauler et al. ......................... 277/552 |
| 5,711,730 |   | 1/1998 | Friedman ............................. 474/18 |
| 5,813,674 | * | 9/1998 | Dickie et al. ......................... 277/390 |
| 5,833,245 | * | 11/1998 | Gallagher ............................ 277/438 |

FOREIGN PATENT DOCUMENTS

406193739 A  *  7/1994  (JP) ..................................... 277/395

* cited by examiner

Primary Examiner—Thomas R. Hannon
(74) Attorney, Agent, or Firm—Darby & Darby

(57) ABSTRACT

A continuously variable speed transmission with two adjustable sheaves and an endless chain trained over the sheaves has a torque transmitting and monitoring unit which is installed between a prime mover, such as the engine of a motor vehicle, and an axially movable flange of one of the sheaves. The monitoring unit has two annular plenum chambers which are sealed from each other while the ratio of the transmission is within a first range, and which communicate with each other when the ratio is within a second range. A check valve between the two chambers can employ a resilient annular seal having a U-shaped cross-sectional outline. A radially outer annular portion of the seal has a lip which normally bears against the internal surface of an annular member of the valve. The seal further comprises an annular radially inner portion, and the radially inner and/or outer portion of the seal can be provided with L-shaped, polygonal and/or otherwise configured and/or profiled reliefs to further ensure proper operation of the valve.

23 Claims, 8 Drawing Sheets

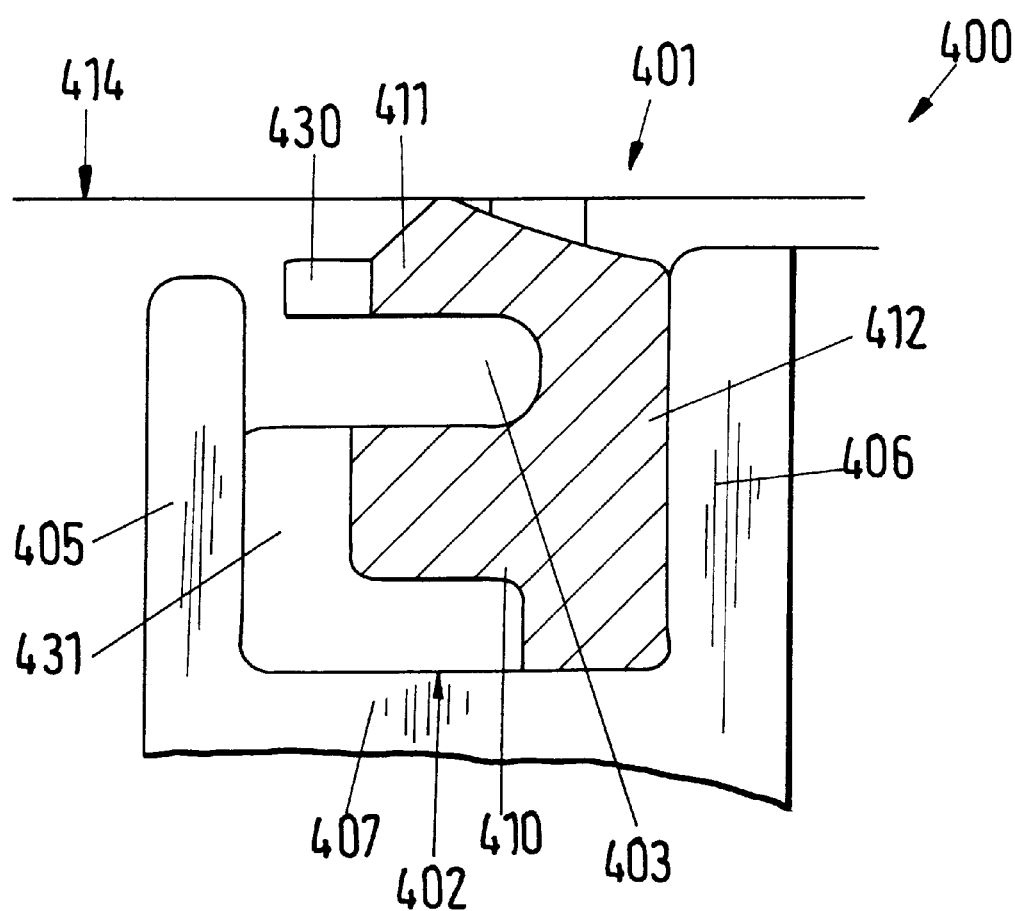

VARIABLE SPEED TRANSMISSION

BACKGROUND OF THE INVENTION

The invention relates to improvements in transmissions, and more particularly to improvements in continuously or infinitely variable transmissions of the type suitable for use in the power trains of motor vehicles.

A transmission of the type to which the present invention pertains comprises a first adjustable sheave or pulley which can be driven, for example, by the output element (such as the crankshaft or the camshaft) of an internal combustion engine in the power train of an automotive vehicle, a second adjustable sheave or pulley which can transmit torque to a clutch or to a differential in the power train of the vehicle, and at least one endless flexible element (such as a belt or a chain and hereinafter referred to as chain) which is trained over and can transmit torque between the first and second sheaves. As a rule, each sheave comprises a first flange which is rigid (e.g., of one piece) with a shaft, and a second flange which cannot rotate relative to but is movable axially of the shaft. It is also known to provide a transmission of the above outlined character with at least two plenum chambers which can receive a pressurized fluid from a suitable source, and with an annular sealing device (such as a sealing ring) which can serve to establish or to interrupt the flow of fluid between the chambers.

A transmission of the above outlined character is disclosed, for example, in published German patent application Serial No. 195 44 644. Such transmissions can employ a lip seal which can prevent the flow of fluid between two chambers when the pressure of fluid in one of the chambers is higher than that of the fluid in the other chamber but which is expected to permit the fluid to flow from the other chamber into the one chamber when the pressure of fluid is higher in the other chamber.

A drawback of such standard sealing devices is that a lip seal is likely to be shifted and/or tilted and/or otherwise deformed and/or displaced so that it is incapable of reliably permitting the flow of a fluid (such as oil) from one of the plural chambers into the other chamber or chambers when such flow is desirable or necessary for proper operation or functioning of the transmission.

OBJECTS OF THE INVENTION

An object of the invention is to provide a transmission of the above outlined character with a novel and improved sealing device which can regulate the flow of a fluid between several chambers, such as plenum chambers, in a reliable and predictable manner.

Another object of the invention is to provide a sealing device which is more reliable than heretofore known and presently utilized sealing devices.

A further object of the invention is to provide a simple, compact and relatively inexpensive sealing device which can be put to use in existing types of continuously or infinitely variable speed transmissions in the power trains of motor vehicles.

An additional object of the invention is to provide a transmission which embodies at least one sealing device of the above outlined character.

Still another object of the invention is to provide a novel and improved receptacle for a sealing device of the above outlined character.

Another object of the invention is to provide a transmission embodying a torque sensing, selecting and monitoring unit which, in turn, embodies a sealing device of the above outlined character.

A further object of the invention is to provide novel and improved adjusting means for the sheaves of the above outlined continuously or infinitely variable speed transmission.

An additional object of the invention is provide a sealing device which can reliably regulate (such as permit, prevent or throttle) the flow of a fluid between two or more plenum chambers of a continuously variable speed transmission under circumstances when a conventional sealing device fails to function at all or is unlikely to function in a predictable, desirable or required manner.

Still another object of the invention is to provide a novel and improved method of regulating the flow of a fluid (such as oil at superatmospheric pressure) between the chambers of a continuously variable speed transmission, e.g., a transmission which can be put to use in the power train of a passenger car, truck or another motor vehicle.

A further object of the invention is to provide a transmission wherein the flow of a fluid between the chambers of a torque monitoring device and/or between the chambers of adjusting means for one or both sheaves of the transmission can be regulated in the above outlined manner and by resorting to at least one sealing device of the above outlined character.

Another object of the invention is to provide an annular sealing device which can stand long periods of use in a continuously variable speed transmission, which can be mass produced at an acceptable cost, and which can be installed and/or removed and replaced in a simple and time-saving operation.

An additional object of the invention is to provide a power train which employs a transmission of the above outlined character.

SUMMARY OF THE INVENTION

The invention is embodied in a transmission which comprises a first adjustable rotary sheave or pulley (hereinafter called sheave) including coaxial first and second flanges one of which is movable axially toward and away from the other flange, a second adjustable rotary sheave or pulley (hereinafter called sheave) including coaxial first and second flanges with one of these flanges movable axially toward and away from the other flange, at least one endless flexible torque transmitting element (such as a chain) trained over the two sheaves, a source of pressurized fluid, adjusting means having at least two fluid receiving chambers and means for connecting at least one of the chambers to the source, and means for regulating the flow of fluid between the at least two chambers. The flow regulating means comprises at least one annular sealing device.

The at least one annular sealing device can comprise an annular radially outer portion, an annular radially inner portion, and an annular intermediate portion disposed between and connecting the radially inner and radially outer portions with each other. The radially inner and radially outer portions of the at least one sealing device can extend in the direction of a common axis of the three portions, and the intermediate portion can extend at least substantially radially of the common axis. The intermediate portion of the at least one sealing device can be located in a plane which is at least substantially normal to the common axis of the three portions, and at least a major part of each of the radially inner and outer portions can be located at one side of such plane.

In accordance with a feature of the invention, at least one of the radially inner and radially outer portions of the at least one sealing device can include a plurality of reliefs which are spaced apart from each other in a circumferential direction of the at least one of the radially inner and radially outer portions. If each of the radially inner and radially outer portions of the at least one annular sealing device has a set of reliefs, the distribution of such reliefs in or on one of the radially inner and radially outer portions may but need not be the same as the distribution of reliefs in or on the other of the radially inner and radially outer portions. At least one of the plural reliefs can have a substantially or exactly rectangular, square or L-shaped cross-sectional outline.

For example, the radially inner and/or the radially outer portion of the at least one sealing device can have between about 5 and 40 reliefs, preferably between about 20 and 30 reliefs. In accordance with a presently preferred embodiment, the radially inner and/or the radially outer portion can have close to or exactly 24 reliefs.

The reliefs can but need not always be at least substantially equidistant from each other (as seen in the circumferential direction of the respective (radially inner and/or radially outer) portion of the at least one sealing device).

The regulating means can further comprise a receptacle having an annular recess or groove for the at least one annular sealing device. Such receptacle can include spaced-apart first and second walls extending at least substantially radially of the common axis of the three portions of the at least one sealing device, and a third wall located radially inwardly of the radially inner portion of the at least one sealing device. At least one of the first and second walls can be provided with a plurality of openings and/or a plurality of recesses. Furthermore, at least two walls of the receptacle can be of one piece with each other. For example, the receptacle can comprise a plurality of interconnected components or parts including a first component embodying one of the walls and at least one second component embodying the other walls. The first component can include a ring, and the one wall which forms part of the first component is provided with the aforementioned openings and/or recesses. The at least one second component can be provided with recesses and/or openings which communicate with the recesses and/or openings of the one wall which forms part of the first component.

The at least one annular sealing device can be designed, constructed and assembled in such a way that it includes an elastically deformable first annular section and a non-elastic annular second section which is at least partially confined in the first section.

The regulating means can further comprise means for confining the at least one sealing device in the receptacle. Such confining means can comprise at least one arm extending in the direction of the common axis of the annular portions of the at least one sealing device and into an annular recess or groove which is adjacent the intermediate portion and is disposed between the radially inner and radially outer portions of the at least one sealing device.

The adjusting means can be arranged to move the one flange of one of the sheaves axially of the other flange of such one sheave.

Alternatively, the adjusting means can include means for urging the flanges of one of the sheaves against the endless chain with a variable force.

The transmission can further comprise means for transmitting to one of the sheaves a variable torque, and means for monitoring the magnitude of the variable torque; the adjusting means can be associated with such monitoring means (for example, the chambers can be provided in the monitoring means).

The novel features which are considered as characteristic of the invention are set forth in particular in the appended claims. The improved transmission itself, however, both as to its construction and the mode of operation of its regulating means, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1b is an enlarged view of a portion of the structure which is shown in FIG. 1a;

FIG. 3a is an enlarged fragmentary axial sectional view of one presently preferred regulating means with an annular sealing device having a generally U-shaped cross-sectional outline and with a receptacle for the sealing device;

FIG. 3b is an enlarged fragmentary elevational view of one wall of the receptacle as seen from the left-hand side of FIG. 3a;

FIG. 4a is a fragmentary axial sectional view similar to that of FIG. 3a but showing a modified sealing device and a modified receptacle therefor;

FIG. 4b is an enlarged fragmentary elevational view of one wall of the receptacle as seen from the left-hand side of FIG. 4a;

FIG. 4c is an enlarged view of the structure which is shown in FIG. 4a;

DESCRIPTION OF PREFERRED EMBODIMENTS

The structures shown in FIGS. 1, 1a, 2 and 3 are similar to those respectively shown in FIGS. 1, 1a, 2 and 3 of commonly owned U.S. Pat. No. 5,711,730 granted Jan. 27, 1998 to Oswald Friedmann and Armin Veil for "TORQUE MONITORING APPARATUS". The disclosures of this patent and of each and every other patent and/or (U.S. and/or foreign) patent application identified in this specification are incorporated herein by reference.

Figure 1:
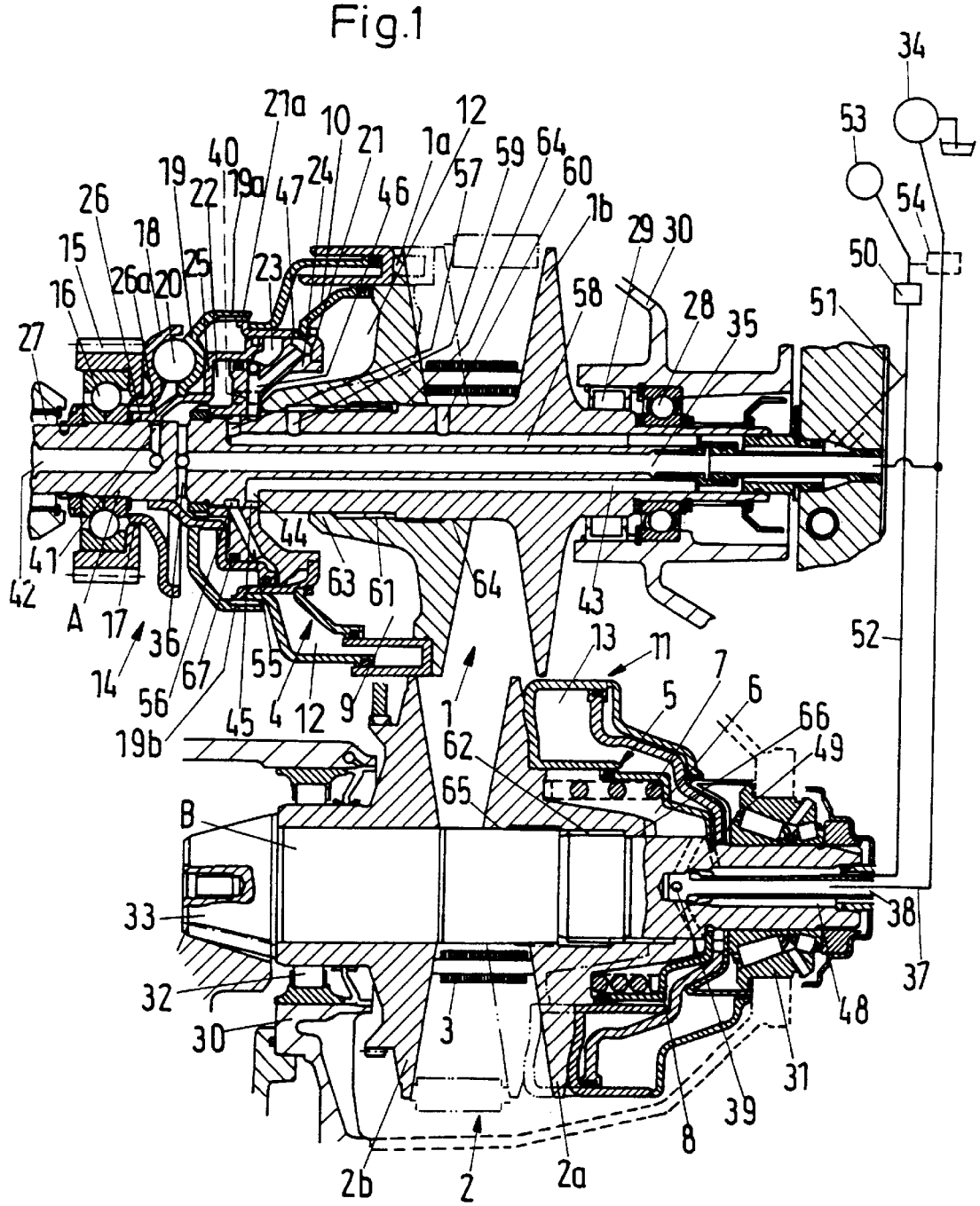
FIG. 1 is a fragmentary axial sectional view of a power train embodying a continuously variable speed transmission which employs adjusting means and regulating means constructed, installed and operated in accordance with a first embodiment of the invention.
Figure 1A:
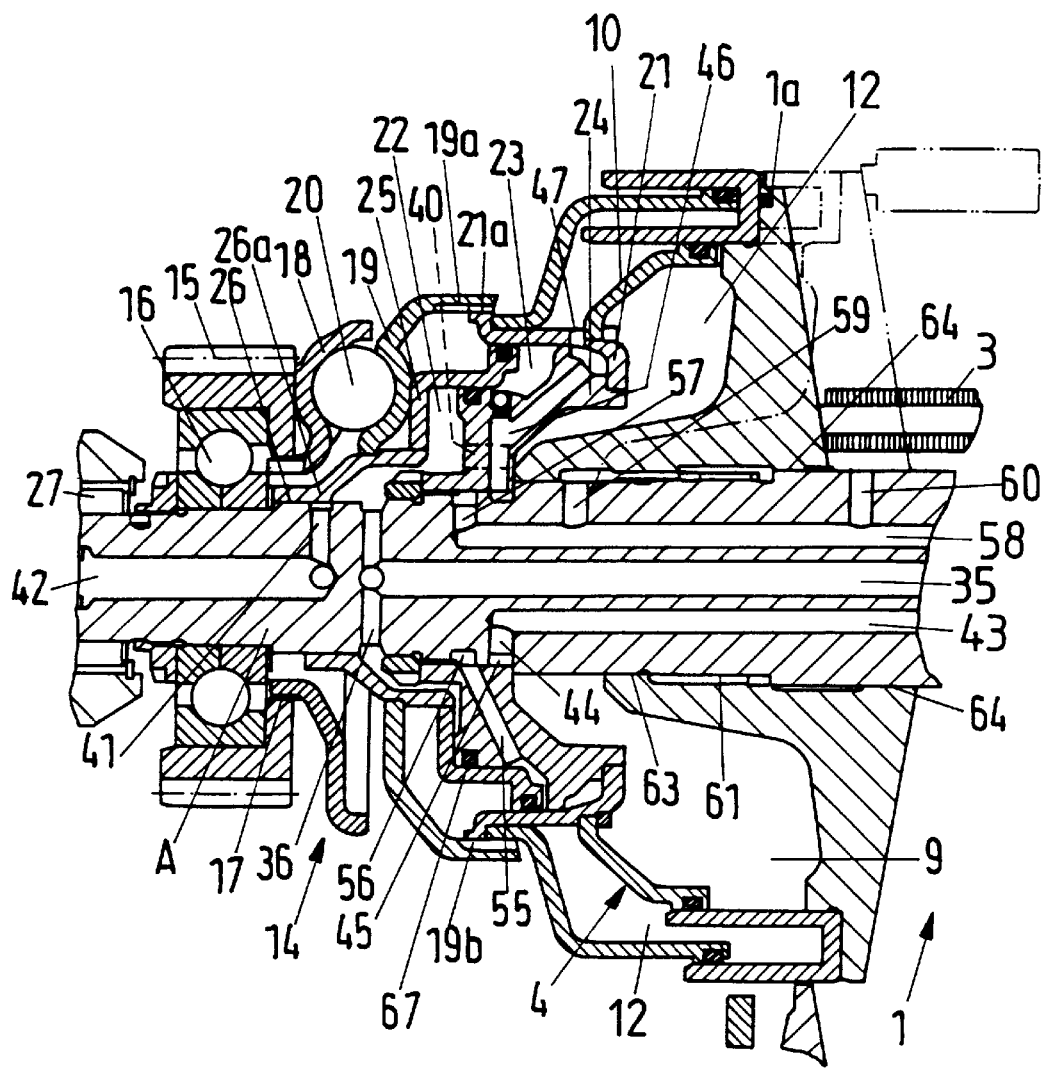
FIG. 1a is an enlarged view of a portion of the power train which is shown in FIG. 1.

Referring first to FIGS. 1 and 1a, there is shown a portion of a power train which can be utilized in a motor vehicle and comprises a continuously or infinitely variable speed transmission having a first adjustable sheave 1, a second adjustable sheave 2, and an endless flexible chain 3 trained over and arranged to transmit torque between the two sheaves. The first sheave 1 is non-rotatably carried by the rotary output element A of a prime mover; the output element A can constitute the camshaft or the crankshaft of the internal combustion engine in the power train of the motor vehicle. The sheave 2 is non-rotatably mounted on a second shaft B; for example, the shaft B can transmit torque to a friction clutch or to a differential in the aforementioned power train.

The sheave 1 comprises a fixed flange 1b which can be of one piece with the shaft A, and a flange 1a which is non-roatably but axially movably carried by the shaft A. Analogously, the sheave 2 comprises a flange 2b which is (or which can be) of one piece with the shaft B, and a flange 2a which is axially movably but non-rotatably mounted on such shaft. The end faces of the chain 3 contact the adjacent conical surfaces of the flanges 1a, 1b and 2a, 2b.

Figure 2:
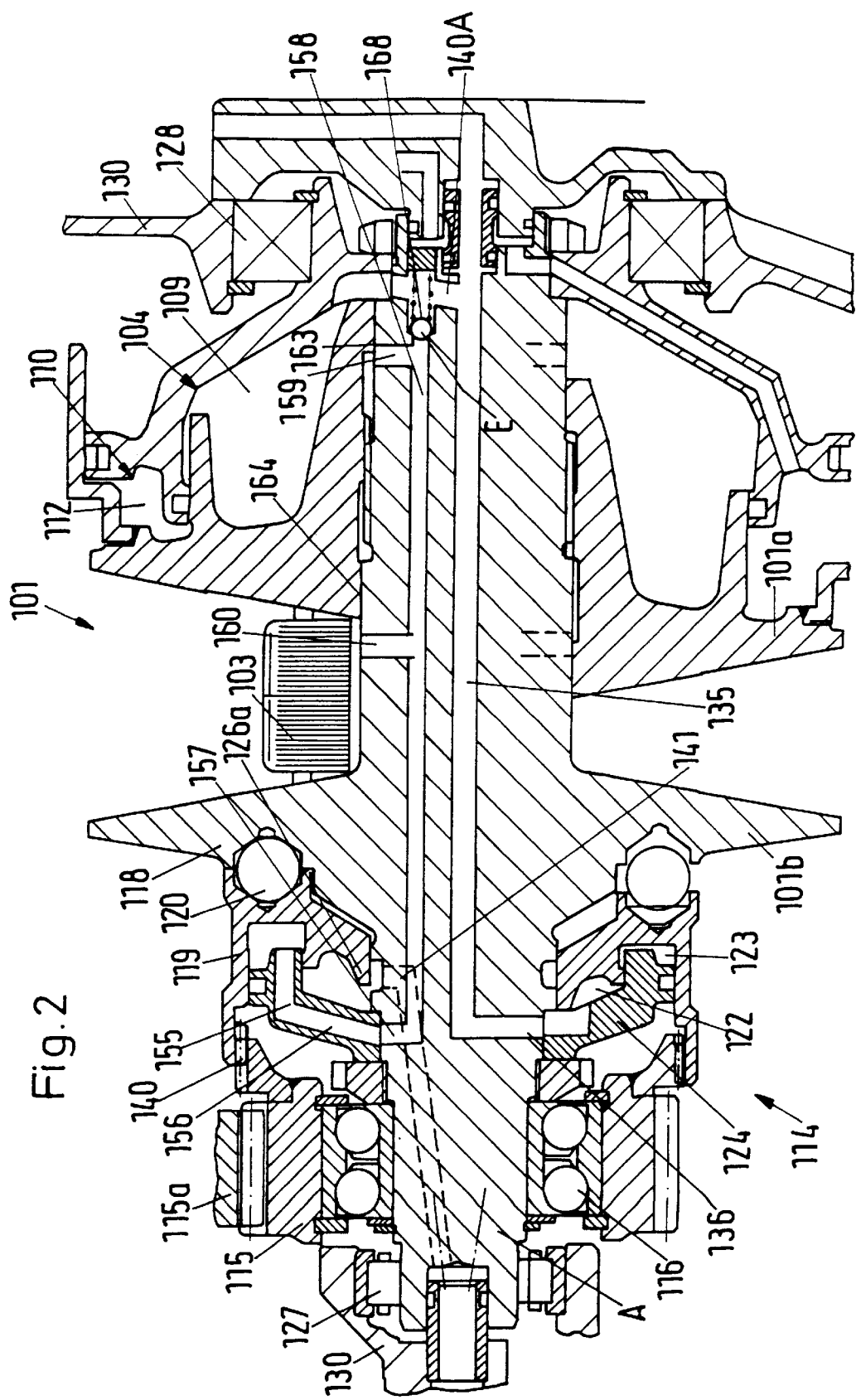
FIG. 2 is a fragmentary axial sectional view similar to that shown in the upper part of FIG. 1 but depicting certain details of a power train embodying a modified transmission.

The ratio of the transmission including the sheaves 1 and 2 assumes a maximum value when the flange 1a is moved to an axial position (shown in FIGS. 1 and 1a by phantom lines) in which it is nearest to the axially fixed flange 1b; at such time, the flange 2a assumes the solid-line position of FIG. 1, i.e., at a minimum axial distance from the flange 2b. That arcuate portion of the chain 3 which is trained over the sheave 1 is then located at a maximum radial distance from the common axis of the shaft A and flanges 1a, 1b (such position of the just mentioned arcuate portion of the chain 3 is shown in FIGS. 1 and 2 by phantom lines); at such time, that arcuate portion of the chain 3 which is trained over the sheave 2 is located at a minimum distance from the common axis of the shaft B and flanges 2a, 2b (the corresponding position of this last-mentioned portion of the chain 3 is shown in FIG. 1 by solid lines). The RPM of the shaft B is higher (e.g., much higher) than the RPM of the shaft A, i.e., the transmission operates in overdrive.

In order to operate in underdrive (i.e., to rotate the shaft B at a speed less than that of the shaft A), the flange 1a must be moved away from the flange 1b (e.g., to the solid-line position of FIGS. 1 and 1a at a maximum axial distance from the flange 1b), and the flange 2a must be moved axially toward the flange 2b (e.g., to the phantom-line position of FIG. 1). At such time, that arcuate portion of the chain 3 which is trained over the sheave 1 assumes the solid-line position shown in FIGS. 1 and 1a whereas the arcuate portion of the chain 3 which is trained over the sheave 2 assumes the phantom-line position of FIG. 1.

The flange 1a assumes the solid-line positions shown in the upper halves of the sheave 1 shown in FIGS. 1 and 1a when the transmission is set for operation in underdrive, and such flange 1a assumes the solid-line positions shown in the lower halves of the sheave 1 when the transmission operates in overdrive. Inversely, the flange 2a assumes the position shown by solid lines in the upper half of the sheave 2 of FIG. 1b when the transmission is set for operation in underdrive, and this flange assumes the position shown by solid lines in the lower half of the sheave 2 shown in FIG. 1 when the transmission is set for operation in overdrive.

The means for adjusting the axial position of the flange 1a (in order to select the magnitude of frictional force acting between the conical surfaces of the flanges 1a, 1b and the adjacent portion of the chain 3) comprises a fluid-operated (such as hydraulic) cylinder-and-piston unit 4. An analogous cylinder-and-piston unit 5 is provided to change the axial position of the flange 2a in order to select the magnitude of frictional force acting between the conical surfaces of the flanges 2a, 2b and the adjacent portion of the chain 3.

A chamber 6 of the cylinder-and-piston unit 5 contains a resilient element 7 in the form of a coil spring which is stressed to urge the flange 2a axially toward the flange 2b. As shown in FIG. 1, the coil spring 7 stores a maximum amount of energy when the flange 2a assumes an axial position (illustrated by solid lines in the lower half of the sheave 2 of FIG. 1) at a maximum distance from the flange 2b, i.e., when the arcuate portion of the chain 3 is free or is caused to move to a position at a minimum distance from the common axis of the shaft B and flanges 2a, 2b. In other words, the frictional engagement between the conical surfaces of the flanges 2a, 2b and the adjacent end faces of the chain 3 assumes a maximum value when the transmission including the sheaves 1 and 2 is set to operate in overdrive. Furthermore, the bias of the spring 7 increases (gradually or in another desired manner) in response to movement of the flange 2a to any one of different positions at selected axial distances from the flange 2b (but in a direction toward the flange 2b). The coil spring 7 reacts against an internal shoulder of a tubular member 8 which is fixedly secured to the shaft B, and bears directly upon the adjacent side or surface of the axially movable flange 2a.

The cylinder-and-piston unit 4 operates in parallel with a third cylinder-and-piston unit 10, and the cylinder-and-piston unit 5 operates in parallel with a fourth cylinder-and-piston unit 11. The purpose of the units 10, 11 is to change the ratio of the transmission, i.e., to shift the chain 3 radially of the axes of the shafts A and B. The unit 10 has a plenum chamber 12, and the unit 11 has a plenum chamber 13; when the chamber 12 receives pressurized fluid and the chamber 13 is free to discharge fluid, the flange 1a moves toward the flange 1b and the flange 2a moves away from the flange 2b to thus increase the RPM of the shaft B relative to the RPM of the shaft A. Inversely, the RPM of the shaft B drops if the chamber 12 is free to discharge fluid while the chamber 13 receives pressurized fluid because the flange 2a then moves axially toward the flange 2b while the flange 1a moves axially of and away from the flange 1b. The means for supplying pressurized fluid (such as oil) to the chamber 12 or 13 comprises at least one pump or another suitable source of pressurized fluid.

The means for controlling the flow of fluid into and from the chambers 12, 13 of the respective units 10, 11 comprises one or more suitable valves. A valve which can be utilized in the transmission of FIGS. 1 and 1a to control the flow of fluid into and from the chambers 12, 13 is disclosed, for example, in published German patent application Serial No. 40 36 683. FIG. 2 of this publication shows a valve 36 having a square gate and arranged to regulate the flow of pressurized fluid supplied by a source 14 in the form of a pump.

The power train of FIGS. 1 and 1a further comprises a torque transmitting and monitoring device 14 (hereinafter called sensor or torque sensor) which is arranged to transmit torque from a driver gear 15 to the sheave 1. The operation of the sensor 14 which is shown in FIGS. 1 and 1a is based on the hydromechanical principle. The gear 15 is mounted on an anti-friction ball bearing 16 which surrounds the shaft A. The sensor 14 comprises a cam disc 18 which is fixed against rotation relative to the gear 15 by complementary male and female teeth or splines (as at 17) and which abuts the gear 15. In addition to the axially fixed cam disc 18, the sensor 14 comprises an axially movable cam disc 19. The confronting surfaces of the cam discs 18, 19 have ramps which contact a set of spherical spreading or distancing elements 20. The disc 19 is movable axially of but cannot rotate relative to the shaft A. To this end, the cam disc 19 is non-rotatably secured to an annular member 21 which, in turn, is secured to the shaft A in such a way that the parts A and 21 cannot rotate and/or move axially relative to each other. The radially outer part 19a of the cam disc 19 carries an annulus of teeth 19b which mate with complementary teeth 21a provided on the annular member 21; the mating teeth 19b, 21a ensure that the parts 19 and 21 cannot turn relative to each but that the part 19 can move axially relative to the part 21 and cam disc 18.

The sensor 14 is provided with two annular plenum chambers 22 and 23. The chamber 22 is defined by an annular member 24 which is rigidly secured to the shaft A, and by members 24, 25 which can form part of or are affixed to the cam disc 19. The annular chamber 23 is located radially outwardly of and is offset relative to the chamber 22, as seen in the axial direction of the shaft A. This second annular chamber 23 is defined in part by the aforementioned annular member 24 which is rigid with the shaft A, as well as by the aforementioned annular member 21 which is also affixed to the shaft A. Still further, a portion of the chamber 23 is bounded by the aforementioned member 25; the latter is rigid with the cam disc 19, i.e., it is mounted with freedom of axial movement relative to the shaft A and acts not unlike a piston or plunger.

The transmission of FIGS. 1 and 1a further comprises a housing 30 for the shaft A and the sheave 1. That end portion of the shaft A which is nearer to the torque sensor 14 is journalled in a needle bearing 27 of the housing 30; the other end portion of the shaft A (at the right-hand side of the sheave 1, as viewed in FIG. 1) can be mounted in a combined radial and thrust bearing 28, e.g., a ball bearing. Alternatively, and as actually shown in FIG. 1, the right-hand end portion of the shaft A can be mounted in the housing 30 in a thrust ball bearing 28 and in a radial roller bearing 29. The right-hand end portion (as viewed in FIG. 1) of the (normally) driven shaft B is rotatably mounted in a twin tapered roller bearing 31 which is installed to take up radial stresses as well as axial stresses in directions to the right and to the left, as viewed in FIG. 1. The left-hand portion of the shaft B is rotatably mounted in the housing 30 by way of a roller bearing 32. Furthermore, the left-hand end portion of the shaft B is provided with or carries a bevel gear 33 which can drive a torque receiving assembly (e.g., a differential) in the power train including the transmission of FIGS. 1 and 1a.

The source of fluid, the pressure of which is modulated by the sensor 14 at least as a function of transmitted torque and which is necessary to select the frictional forces acting between the chain 3 and the flanges 1a, 1b and 2a, 2b, includes a pump 34 which can supply pressurized fluid to the chamber 22 by way of a centrally located axially extending channel 35 and at least one radial channel 36 of the shaft A. The outlet of the pump 34 is further connected with the chamber 6 of the cylinder-and-piston unit 5 by a conduit 37 leading to an axial blind bore or channel 38 of the shaft B. The channel 38 can communicate with the chamber 6 by way of one or more radial channels 39 of the shaft B.

The plenum chamber 22 of the sensor 14 can communicate with the chamber 9 of the cylinder-and-piston unit 4 by way of a channel 40 which is angularly offset relative to the plane of FIG. 1 or 1a and, therefore, is indicated in these Figures by broken lines. The channel 40 is provided in the aforementioned annular member 24 which is rigidly affixed to the shaft A, and this channel serves to establish permanent communication between the chambers 22 and 9.

The shaft A is further provided with at least one fluid discharging channel 41 which can communicate with the chamber 22 at a rate depending on at least one parameter including the magnitude of the torque being transmitted by the sensor 14. The channel 41 is shown as extending at least substantially radially of the shaft A and its radially inner end communicates with an axial channel 42 of the shaft A. The channel 42 can serve to deliver fluid (such as oil) which is being evacuated from the chamber 22 to one or more consumers, e.g., for the purposes of lubrication. The conduit or conduits receiving fluid from the channel 42 is(are) not shown in FIGS. 1 and 1a.

The means for regulating the rate of flow of fluid from the chamber 22 via channel 41 includes the radially inner portion 26a of the cam disc 19 which is movable axially of the shaft A in dependency on the magnitude of the torque being transmitted from the gear 15 to the sheave 1. Thus, the radially inner portion 26a of the cam disc 19 and that portion of the shaft A which defines the radially outer portion of the channel 41 can be said to constitute a valve or flow restrictor (throttle). The axial position of the cam disc 19 varies as a function of variations of the magnitude of torque being transmitted between the cam discs 18, 19 of the sensor 14 and, consequently, the rate of outflow of fluid from the chamber 22 via channels 41, 42 also varies in dependency on changes of the magnitude of such torque. The axial position of the cam disc 19, in turn, determines the pressure of fluid in the chamber 22, i.e., the difference between the pressure at the outlet of the pump 34 and the pressure in the chamber 22. Since the chamber 22 communicates with the chamber 9 (by way of the channel 40) as well as with the chamber 6 (via channels 35, 36, conduit 37 and channels 38, 39), the pressure of fluid in the chambers 9 and 6 is also a function of the axial position of the cam disc 9, i.e., of the magnitude of the torque being transmitted between the cam discs 18 and 19.

Since the cylinder-and-piston units 4, 5 operate in parallel with the cylinder-and-piston units 10, 11, respectively, the pressure of fluid in the chamber 22 (i.e., the magnitude of the torque being transmitted by the aforesaid sensor 14) determines the forces which are generated by the units 4, 10 upon the flange 1a and the adjacent portion of the chain 3 as well as the forces which are generated by the units 5, 11 upon the flange 2a and the adjacent portion of the chain 3.

The chamber 12 of the cylinder-and-piston unit 10 can receive pressurized fluid by way of an axially parallel channel 43 and at least one radially extending channel 44, both provided in the shaft A. The latter further comprises an annular external groove 45 which communicates with the radially outer end(s) of the radial channel(s) 44 as well as with the radially inner end portion(s) of one or more channels 46 provided in the member 24. The illustrated channel 46 communicates with the chamber 12 by way of a channel or port or bore 47 in the annular member 21.

The chamber 13 of the cylinder-and-piston unit 11 receives fluid by way of an annular channel 48 which is provided in the shaft B and surrounds the channel 38. The channel 48 can admit fluid into one or more radially extending channels 49 machined into or otherwise formed in the shaft B and communicating with the chamber 13.

The channels 43 and 48 receive pressurized fluid from a common source 53 by way of conduits 51, 52 wherein the flow of fluid is regulated by a valve 50. The pump 53 is optional or can be used from time to time. To this end, the hydraulic system of the power train shown in FIGS. 1 and 1*a* further comprises a suitable pressure distributing unit 54 (shown in FIG. 1 by broken lines) which is or which can be designed to regulate the pressure of fluid flowing from the pump 34 into the channels 35, 38, to regulate the pressure of fluid then flowing from the pump 34 into the valve 50 and thence into the conduits 51, 52, and to regulate the quantities of fluid flowing into the conduit 37 on the one hand and into the conduit 51 on the other hand. The unit 54 can comprise two or more valves (not specifically shown in FIG. 1).

When it receives pressurized fluid, the chamber 23 of the sensor 14 is connected in parallel with the chamber 22, When the flange 1*a* assumes the solid-line position shown in the upper half of the sheave 1 (as viewed in FIGS. 1 and 1*a*), the chamber 23 is sealed from the corresponding source of pressurized fluid (pump 34) because the path for the flow of fluid from the outlet of the pump 34 to the chamber 23 (via channels and/or bores 55, 56, 57, 58, 59, 60 shown in FIGS. 1 and 1*a*) is then sealed. At such time, the radially outer end of the bore 60 in the shaft A is fully exposed (i.e., it is not overlapped by the internal surface of the axially movable flange 1*a*) so that the pressure in the chamber 23 matches atmospheric pressure. Furthermore, the axial force applied to the cam disc 19 in dependency on the magnitude of the torque being transmitted by the sensor 14 is taken up solely by pressurized fluid which is entrapped in the chamber 22. The pressure of fluid in the chamber 22 rises in response to increasing magnitude of the torque being transmitted by the sensor 14. As already explained hereinbefore, the pressure of fluid in the chamber 22 is dependent upon the axial position of the radially inner portion 26*a* of the cam disc 19 relative to the radially outer (intake) end of the radial bore 41 in the shaft A.

If the transmission is to be shifted to a higher ratio, the flange 1*a* is moved axially toward the flange 1*b* of the sheave 1 and, consequently, the flange 2*a* is moved axially of and away from the flange 2*b* of the sheave 2. The flange 1*a* can be moved all the way to the axial position shown by solid lines in the lower half of the sheave 1 depicted in FIGS. 1 and 1*a*, and the flange 2*a* can be moved all the way to the axial position shown by solid lines in the lower half of the sheave 2 depicted in FIG. 1. This involves an appropriate manipulation (setting) of the valve 50, i.e., the chamber 12 receives pressurized fluid whereas the chamber 13 is connected to the sump or to another fluid receiving means. In other words, the volume of the chamber 12 increases with attendant corresponding reduction of the capacity of the chamber 13.

The flange 1*a* of the sheave 1 is non-rotatably but axially movably connected with the shaft A by sets of complementary teeth or splines 61. Analogous teeth or splines 62 are provided at the internal surface of the flange 2*a* and at the periphery of the shaft B to ensure that the flange 2*a* cannot turn relative to but is movable axially of the shaft B.

The internal surface of the flange 1*a* has axially spaced-apart cylindrical centering portions 63, 64 which surround the peripheral surface of the shaft A with minimal play, i.e., the centering portions 63, 64 prevent wobbling and/or other stray movements of the flange 1*a*. Analogous centering portions 65, 66 form part of the internal surface of the flange 2*a* to ensure that the flange 2*a* is reciprocable toward and away from the flange 2*b* without any or without noticeable radial play relative to the shaft B.

Those portions of the flange 1*a* which are provided with the centering surfaces 63, 64 form part of two valves which control the flow of fluid in the radial channels 59, 60 of the shaft A in dependency upon the axial position of the flange 1*a*. Thus, when the flange 1*a* leaves the position which is shown in the upper half of the sheave 1 by solid lines and moves in a direction to the right (toward the axially fixed flange 1*b*), the surface portion 64 gradually closes the radially outer end of the channel 60. At the same time, the internal surface portion 63 seals the radially outer end of the radial channel 59. As the flange 1*a* continues to move axially toward the flange 1*b*, the surface portion 64 continues to seal the radially outer end of the channel 60 but the surface portion 63 gradually moves over and beyond the radially outer end of the channel 59. This enables the channel 59 to establish communication between the chamber 9 of the cylinder-and-piston unit 4 and the channel 58 which, in turn, entails the establishment of communication with the chamber 23 by way of the channels 57, 56 and 55. At such time, the channel 60 is sealed (or practically sealed) by the internal surface portion 64 but the chamber 9 is free to communicate with the chambers 22, 23. Consequently, the pressure in the chambers 22, 23 matches that in the chamber 9 and (via channel 35, conduit 37 and channel 38) also the pressure in the chamber 6 (it is assumed here that one disregards the relatively small or minimal losses attributable to flow resistance and/or leakage).

Owing to the establishment of communication between the chambers 22, 23 as a function of the selected transmission ratio (i.e., as a function of axial position of the flange 1*a*), the axially effective area of the fluid cushion in the torque sensor 14 is increased because the axially effective area of the fluid in the chamber 23 is added to that of the fluid in the chamber 22. The significance of such increase of the axially effective fluid cushion is that, while the magnitude of the transmitted torque remains unchanged, the pressure being built up by the sensor 14 is reduced at least substantially proportionally with the increase of the axially effective area; this, in turn, entails a corresponding reduction of fluid pressure in the chambers 9 and 6 of the respective cylinder-and-piston units. In other words, the sensor 14 can ensure that a pressure modulation which is a function of the transmitted torque is superimposed upon a pressure modulation which is a function of the ratio of the continuously variable speed transmission. Otherwise stated, the torque sensor 14 renders it possible to achieve a two-stage modulation of the pressure or pressure level.

In the embodiment of FIGS. 1 and 1*a*, the mutual spacing of the radial channels 59, 60 as well as the dimensions and the mutual spacing of the centering portions 63, 64 of the internal surface of the flange 1*a* (all as seen in the axial direction of the shaft A) are such that the switchover from the chamber 22 to the chambers 22, 23 and vice versa takes place when the ratio of the transmission including the sheaves 1 and 2 is at least close to 1:1, i.e., when the RPM of the shaft 1 matches or approximates that of the shaft B.

However, it is desirable to prevent an abrupt shift from operation with chamber 22 to operation with chambers 22, 23 or vice versa; to this end, the arrangement is or can be such that the channel 59 is yet to establish communication with the chamber 9 when the channel 60 (for evacuation of fluid) is already sealed. In order to ensure proper operation of the transmission and its torque sensor 14 during the just outlined transition stage (i.e., to ensure that the clutch disc 19 of the sensor 14 is then movable axially of the shaft A), the power train is provided with regulating or compensating means to permit a change of the volume or capacity of the chamber 23 so that the sensor 14 can carry out its "pumping" operation, namely that those parts of the sensor which are to function as piston(s) and cylinder(s) can carry out the necessary movements relative to each other in the axial direction of the shaft A. The regulating or compensating means (hereinafter called regulating means or regulator for short) in the power train of FIGS. 1 and 1a comprises an annular sealing device 67 (see also FIGS. 1b and 1c) which constitutes or acts as a tongue- or lip seal. The annular sealing device or seal 67 is received in a peripheral recess or groove of a receptacle constituted by the aforementioned member 24, and the device 67 cooperates with the cylindrical internal surface of the member 25. When the device 67 is caused or permitted to perform its sealing function, the chambers 22 and 23 are sealed from each other.

An important feature of the sealing device 67 is that it is dimensioned, configurated and mounted to ensure that it can reliably seal in one axial direction of the shaft A but not in the opposite direction. In other words, the device 67 should be capable of preventing an equalization of pressures between the chambers 22, 23 in a direction from one of these chambers but not in the opposite direction. On the other hand, the device 67 should permit an equalization of pressures when the fluid pressure in the other chamber is higher than in the one chamber. It can be said that the device 67 acts as a check valve or one-way valve and is installed and designed in the receptacle 24 in such a way that it prevents the flow of fluid from the chamber 22 into the chamber 23; however, once the pressure in the chamber 23 exceeds the pressure in the chamber 22 to a predetermined extent, the device 67 allows fluid to flow from the chamber 23 into the chamber 22. The fluid can flow from the otherwise sealed chamber 23 into the chamber 22 when the cam disc 19 of the sensor 14 is caused to move in a direction to the right, as viewed in FIG. 1 or 1a. However, when the cam disc 19 thereupon performs a stroke in the opposite direction (namely to the left, as viewed in FIG. 1 or 1a), the fluid pressure or simply pressure in the chamber 23 can drop below atmospheric pressure (in fact, the body of fluid in the chamber 23 can even contain bubbles of air or another gaseous fluid) but the device 67 will continue to establish a reliable seal between the chambers 22 and 23. The presence of air bubbles in the fluid (oil) in the chamber 23 (when the pressure of fluid in this chamber is below that in the chamber 22) is not detrimental to the operation of the torque sensor 14 and/or of the transmission.

The sealing device 67 can be replaced with a simpler sealing device which establishes a permanent two-way sealing action between the chambers 22, 23 if the torque sensor 14 is equipped with a standard one-way valve or check valve which permanently prevents the flow of fluid from the chamber 22 into the chamber 23 but permits the fluid to flow from the chamber 23 into the chamber 22 when the pressure differential between the bodies of fluid in the chambers 23, 22 rises to a preselected value.

Still further, it is possible to install a one-way or check valve between the channels 35 and 58 of the shaft A in such a way that the thus installed valve permits the flow of fluid from the chamber 23 into the chamber 22 when the fluid pressure in the chamber 23 exceeds that in the chamber 22 by a preselected value but that the flow of fluid in the opposite direction (from the chamber 22 into the chamber 23) is prevented at all times.

The preceding description of the mode of operation of the transmission which is shown in FIGS. 1 and 1a and includes the sheaves 1, 2 indicates that, whenever the transmission is being shifted to a lower gear ratio (i.e., when the RPM of the shaft B relative to the RPM of the shaft A is being reduced), the axial force which is being transmitted by the rolling elements 20 between the ramps of the cam discs 18, 19 of the sensor 14 is taken up solely by the axially effective surface of the body of fluid in the chamber 22. However, such force is taken up by the bodies of fluid in the chambers 22 and 23 practically during each and every stage of operation in overdrive (i.e., when the RPM of the shaft B relative to the RPM of the shaft A is caused to increase). Thus, and assuming that the input torque (supplied by the gear 15) remains unchanged, a shifting of the transmission in a sense to reduce the RPM of the shaft B causes the sensor 14 to establish a fluid pressure which is higher than when the transmission is being shifted in a sense to increase the RPM of the shaft B. As already mentioned hereinbefore, the illustrated transmission can be designed in such a way that the switchover point (at which the sealing device 67 permits the establishment of communication between the chambers 22 and 23) can be reached when the transmission ratio is one-to-one. However, such switchover point (or switchover range) can be readily shifted to any point practically within the entire shifting range by appropriate selection of the dimensions and/or positions of the channels 56, 60 and the associated centering portions 63, 64 of the internal surface of the flange 1a.

It is further within the purview of the invention to replace the sealing device 67 with a seal which permanently seals the chambers 22, 23 from each other (in both directions) and to provide a channel which connects the chambers 22, 23 with each other and contains a one-way (check) valve designed to permit fluid to flow from the chamber 23 into the chamber 22 (when the pressure of fluid in the chamber 23 exceeds that of the fluid in the chamber 22 to a predetermined extent) but to always prevent the flow of fluid from the chamber 22 into the chamber 23. The operation of such check valve need not be regulated by axial movements of the flange 1a; for example, the thus modified transmission (and more specifically the thus modified sensor 14) can receive operating impulses from an external energy source. For example, the just discussed check valve in a specially provided channel between the chambers 22, 23 can be a pneumatically, electromagnetically or hydraulically operated valve which regulates the flow of fluid from the chamber 23 into the chamber 22 in dependency upon the selected ratio or upon a change of the ratio of the transmission.

The just discussed valve can constitute a so-called 3/2-way valve which can establish or interrupt communication between the chambers 22 and 23. Alternatively, a pressure-responsive valve can be provided in a conduit or channel connecting the channels 35 and 58 in the shaft A. This would render it possible to dispense with (or to simply permanently seal) the channels 59 and 60. The valve in such channel or conduit between the channels 35 and 58 would also operate in such a way that it would permit fluid to flow from the chamber 23 into the chamber 22 as soon as the pressure of fluid in the chamber 23 rises to a preselected value or exceeds the pressure of fluid in the channel 22 by a predetermined value. The valve can have an outlet which delivers surplus fluid (such as oil) to a sump or to another collecting means.

If the transmission is provided with the aforementioned one-way valve in a specially provided channel or bore connecting the chambers 22, 23 with each other, and if such valve is operated independently of axial movements of the flange 1a, the operation of such valve can be made dependent upon the magnitude of the transmitted torque and/or upon one or more other parameters. For examples the valve can be responsive to the development of abrupt surges of the transmitted torque. Such mode of operation is desirable for several purposes, for example, to prevent the chain 3 from slipping relative to the flanges 1a, 1b and/or 2a, 2b or vice versa (or to at least reduce the likelihood and/or the extent of such slipping) during certain stages of operation of the power train and/or within certain ranges of operation of the transmission.

The torque sensor 14 of FIGS. 1 and 1a is installed close to the torque transmitting input (gear 15) as well as close to (and ahead of) the first sheave 1. However, it is equally possible to install the sensor 14 (or an analogous torque sensor) at many other locations without departing from the spirit of the invention. For example, the torque sensor can be placed adjacent to the shaft B, and more specifically adjacent the axially movable flange 2a of the sheave 2. It is also possible to employ several torque sensors; for example, the torque sensor 14 at the location shown in FIGS. 1 and 1a, and a second torque sensor at the shaft B adjacent the sheave 2a.

It is also possible to utilize the torque sensor 14 (with its chambers 22, 23) for a torque-dependent and/or transmission ratio-dependent pressure modulation in manners other than that shown in and described with reference to FIGS. 1 and 1a. For example, the rolling elements 20 of the illustrated sensor 14 can be arranged to move along adjacent ramps in directions radially toward or away from the axis of the shaft A. Reference may be had, for example, to published German patent application Serial No. 42 34 294.

The chamber 6 of the cylinder-and-piston unit 5 is connected or connectable with the torque sensor 14. However, it is equally possible to design the transmission in such a way that the pressure of fluid in the chamber 14 of the chamber 13 of the cylinder-and-piston unit 11 be influenced by the sensor 14; at such time, the cylinder-and-piston unit 5 and its chamber 6 serve to select the ratio of the thus modified transmission. All that is necessary is to reverse the functions of the conduits 37 and 52 at the second sheave.

Numerous component parts of the torque sensor 14 which is shown in FIGS. 1 and 1a are made of a suitable metallic sheet material. For example, the cam discs 18, 19 can be made of sheet metal in an embossing machine which provides the surfaces that contact the spherical spreading elements 20 with suitable ramps or equivalent configurations.

Figure 1B:
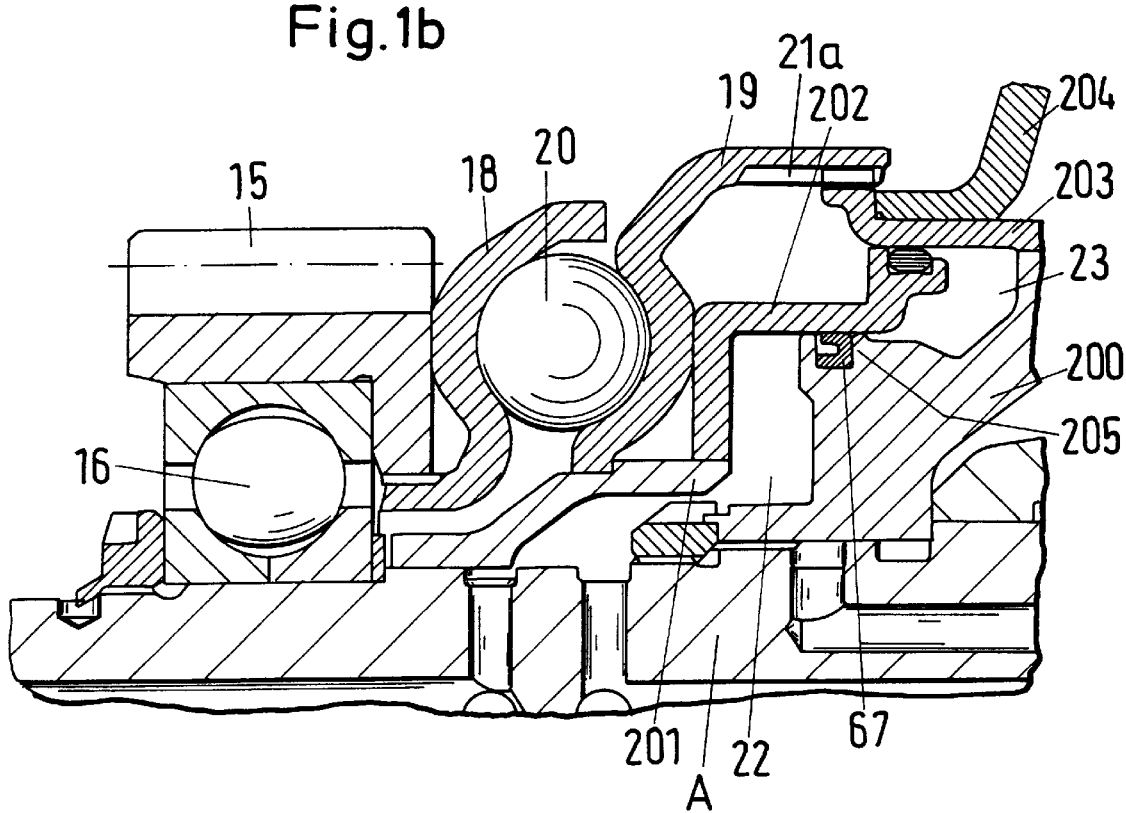
Figure 1C:
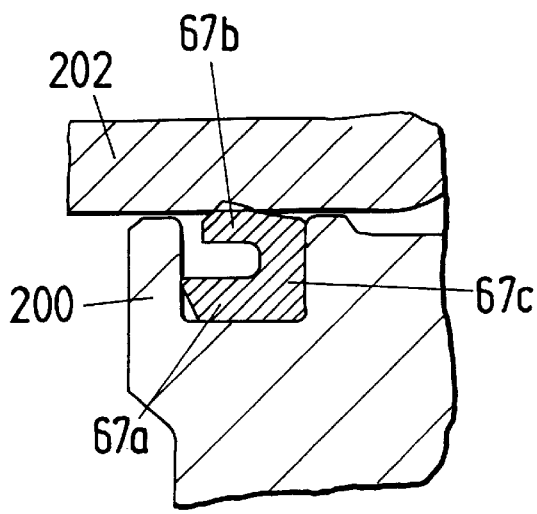
FIG. 1c is an enlarged view of a detail in the structure shown in FIG. 1b.

FIGS. 1b and 1c illustrate certain details of a torque sensor which constitutes a slight modification of the torque sensor 14 shown in FIGS. 1 and 1a. The parts of the receptacle for the annular sealing device are and the parts which define the annular chambers 22, 23 are denoted by reference characters different from those utilized in FIGS. 1 and 1a. The receptacle 200 comprises a peripheral surface provided with a circumferentially complete annular recess or groove 205 for the sealing device 67 which has a substantially L-shaped cross-sectional outline and contacts the radially inner side of a sheet metal wall 202 bounding portions of the chambers 22 and 23. The structure which is shown in FIG. 1b further comprises walls 201, 203 and 204 which, too, can be made of a metallic sheet material. The sealing device 67 has an annular radially inner portion 67a which is located at the bottom of the recess 205 (i.e., nearest to the axis of the shaft A), a radially outer annular portion 67b which contacts or can contact the internal surface of the wall 202, and a radially extending annular intermediate portion 67c connecting one axial end of the inner portion 67a with one axial end of the outer portion 67b. The intermediate portion 67c is or can be located in a plane which is at least substantially normal to the axis of the shaft A, and the annular portions 67a, 67b are located at one and the same side of such plane.

As already explained hereinbefore, the sealing device 67 acts as a lip seal or one-way (check) valve serving to prevent the fluid from flowing in a direction from the chamber 22 into the chamber 23 but permitting (under certain circumstances) the fluid to flow from the chamber 23 into the chamber 22. The radially inner and radially outer annular portions 67a, 67b of the sealing device 67 extend from the intermediate portion 67c in the direction of fluid flow from the chamber 23 into the chamber 22.

FIG. 2 shows a portion of a modified continuously variable speed transmission wherein the axially reciprocable flange 101a of the sheave 101 is remote from the torque sensor 114, i.e., such sensor is nearer to the axially fixed flange 101b. The sensor 114 comprises two suitably profiled cam discs 118, 119 and a set of spherical spreading elements 120 between them. In contrast to the construction of the sensor 14, the cam disc 118 is an integral part of the axially fixed flange 101b of the sheave 101, i.e., the spherical spreding elements 120 track a portion of the flange 101b. However, it is clear that the sensor 114 can be modified by replacing the illustrated cam disc 118 with a separately produced part which is fixedly secured to the flange 101b and/or to the shaft A so that it must share all angular movements of the sheave 101 and cannot move axially of the shaft A.

The axially movable cam disc 119 of the sensor 114 receives torque from a gear 115 which, in turn, receives torque from a prime mover (such as an internal combustion engine, not shown) by way of a gear 115a. The gear 115 is mounted on an antifriction ball bearing 116 (with two annuli of spherical rolling elements) which surrounds the adjacent portion of the shaft A. The latter is rotatable in axially spaced-apart bearings 127, 128 which are installed in a housing 130.

The gear 115 is non-rotatably connected with a coaxial spur gear 140 having an annulus of axially parallel external teeth mating with complementary internal teeth of the cam disc 119 so that the latter receives torque from but can move axially of the gear 115. The external teeth of the spur gear 140 can constitute axially parallel splines, serrations or other configurations, as long as they can transmit torque to the cam disc 119 in such a way that the latter can move axially of the shaft A and cam disc 118.

The sensor 114 is provided with at least two plenum chambers (FIG. 2 shows two annular chambers 122, 123) which are sealed from or communicate with each other in dependency on the momentary ratio of the continously variable speed transmission of FIG. 2. The mode of utilizing or relying upon the chambers 122, 123 is identical with or analogous to that already described with reference to the chambers 22, 23 of the sensor 14 which is shown in FIGS. 1 and 1a. The chambers 122, 123 are defined, at least to a large extent, by an annular member 124 which is affixed to the shaft A, and by the cam disc 119.

The sensor 114 can receive fluid from a source (such as a pump, not shown in FIG. 2) by way of a central axially extending channel 135 which is provided in the shaft A and can supply pressurized fluid to at least one radially extending channel 136 which communicates with the chamber 122. The channel 135 further communicates with at least one additional at least substantially radially extending channel 140A (shown in the right-hand portion of FIG. 2) which serves to supply pressurized fluid to the chamber 109 of a cylinder-and-piston unit 104 serving as or forming part of an adjusting means for the axially movable flange 101a of the sheave 101. The channels 135, 136 and 140A establish a passage which connects the chamber 109 with the chamber 122, i.e., the pressure of fluid in the chamber 109 always matches or at least very closely approximates that of the fluid in the chamber 122.

The unit 104 operates in parallel with a cylinder-and-piston unit 110 having a plenum chamber 112. The functions of the units 104 and 110 are identical with or clearly analogous to those of the cylinder-and-piston units 4 and 10 in the transmission of FIGS. 1 and 1a.

The axially movable cam disc 119 of the sensor 114 includes a radially inner portion 126a which cooperates with the adjacent portion of the shaft A (such portion of this shaft is provided with the inlet or intake end of a fluid discharging or evacuating channel 141 which is provided in the shaft A) to form therewith a flow restrictor or throttle serving to permit outflow of fluid from the chamber 122 at a rate which is a function of the momentary ratio of the transmission, i.e., a function of the axial position of the flange 101a. The just described flow restrictor (126a, 141) enables the sensor 114 to establish and maintain a fluid pressure which is required for reliable transmission of torque from the gear 115 to the sheave 101.

The establishment, the extent and the termination of communication between the chambers 122, 123 of the sensor 114 is effected in a manner analogous to that already described in connection with the operation of the sensor 14 including the chambers 22, 23. FIG. 2 shows channels, conduits and/or bores 155, 156, 157, 158, 159 and 160 which are designed to establish fluid path portions extending in the axial and/or radial direction of the shaft A and permitting or preventing the flow of fluid from one of the chambers 122, 123 into the other of these chambers under circumstances which were already explained with reference to FIGS. 1 and 1a.

FIG. 2 shows that the axially movable flange 101a of the sheave 101 again forms part of valves which partially or fully expose or seal the adjacent ends of the radial channels 159, 160 in the shaft A. The transition zone or switchover point is again dependent on the axial spacing of the radially outer ends of the channels 159, 160 from each other as well as upon the dimensions and the mutual spacing of annular centering portions 163, 164 of the internal surface of the axially movable flange 110a. Due to the aforedescribed communication of the chamber 123 with the chamber 109 of the cylinder-and-piston unit 104, the chamber 123 operates in parallel with the chamber 122 of the sensor 114.

FIG. 2 further shows a check (one-way) valve 168 which performs the function of the sealing device 67 in the transmission of FIGS. 1 and 1a. Thus, the valve 168 ensures that fluid can flow from the channel 158 toward the channel 135 during the transition stage, i.e., during switchover from utilization of the chamber 122 to utilization of the chambers 122, 123 or vice versa, for the purpose of eastablishing an equalization of pressures. The check valve 168 prevents the fluid from flowing in a direction from the chamber 122 into the chamber 123 but permits the fluid to flow from the chamber 123 into the chamber 122 when the fluid pressure in the chamber 123 exceeds the fluid pressure in the chamber 122 by a certain value (or when the fluid pressure in the chamber 123 rises to a predetermined value).

FIG. 2 shows a portion of the chain 103 in a position (as seen radially of the axis of the shaft A) in which the difference between the (higher) RPM of the shaft A and the (lower) RPM of the other shaft (corresponding to the shaft B shown in FIG. 1) reaches a maximum value.

The channel 135 in the shaft A of FIG. 2 can be said to constitute a means for establishing a hydraulic connection between the axially spaced-apart sensor 114 and axially movable flange 101a. Thus, the axially fixed flange 101b of the sheave 101 is located between the sensor 114 and the axially movable flange 101a; on the other hand, te axially movable flange 1a of the sheave 1 shown in FIG. 1 is located between the sensor 14 and the axially fixed flange 1b.

Figure 3:
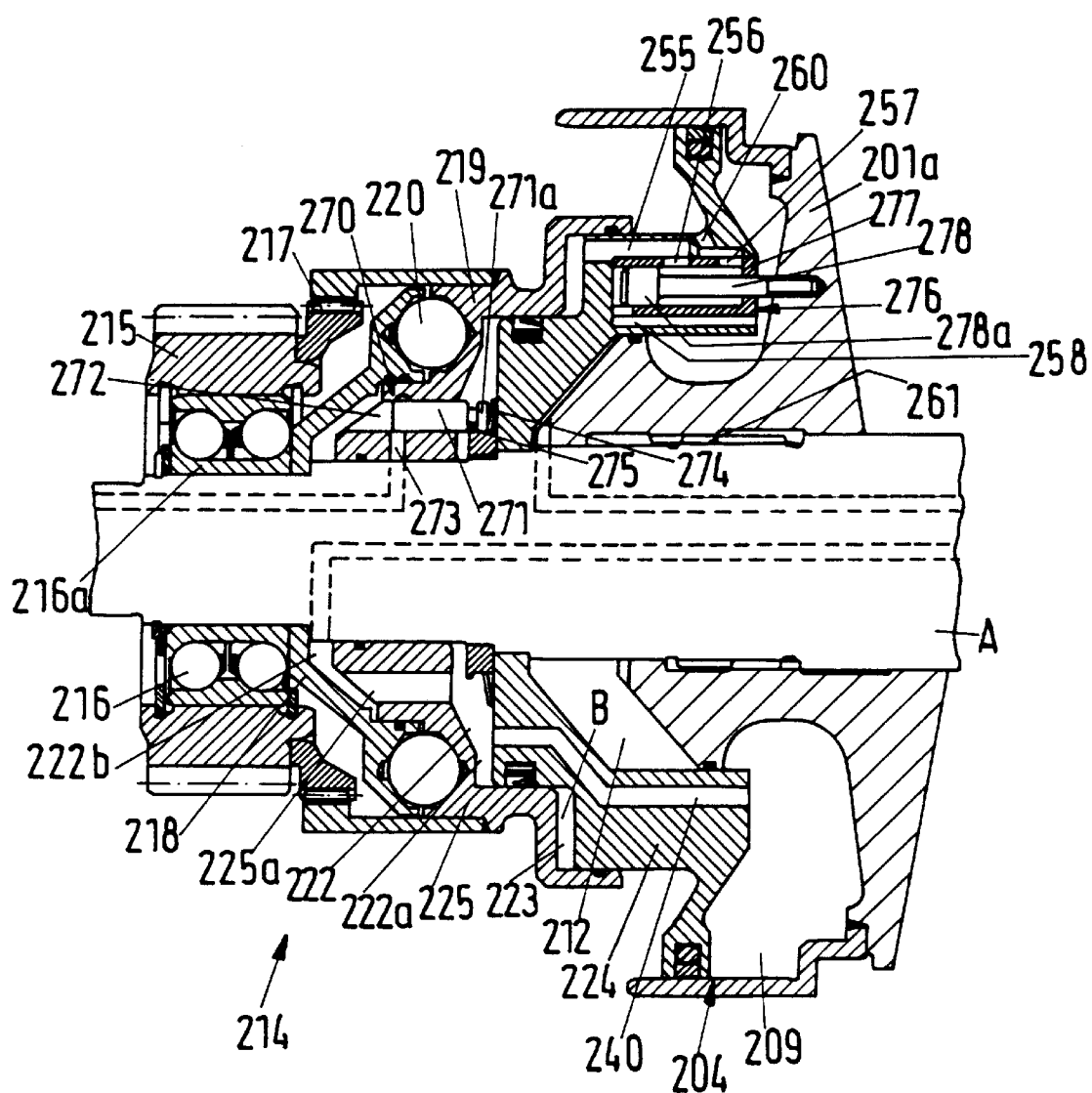
FIG. 3 is a view similar to that of FIG. 1a but showing certain features of a third power train.

FIG. 3 illustrates a portion of a further power train including a continuously variable speed transmission with two sheaves and an endless chain trained over such sheaves. The axially movable flange 201a of one of these sheaves is shown in FIG. 3 adjacent to a modified torque sensor 214. The upper part of FIG. 3 shows the flange 201a in an axial position at a maximum distance from the other (fixed) flange (this is the lowest ratio of the transmission in which the difference between the (higher) RPM of the shaft A and the (lower) RPM of the other shaft (not shown in FIG. 3) reaches a maximum value). The flange 201a assumes the other axial position (shown in the lower part of FIG. 3) when the RPM of the shaft A is below the RPM of the other shaft to a maximum extent.

A portion of the internal surface of the flange 201a is provided with axially parallel splines 261 mating with complementary splines at the periphery of the shaft A to ensure that the angular positions of the parts A, 201a relative to each other remain unchanged but the flange 201a is free to move axially of the shaft A toward and away from the other (fixed) flange of the respective sheave.

The sensor 214 is installed between the driver gear 215 and the flange 201a, the same as already described for the sensor 14 in the power train of FIG. 1. The gear 215 has (or carries a discrete part having) axially parallel external teeth, splines or serrations 217 which mate (directly or indirectly) with internal teeth, splines or serrations of the axially movable cam disc 219 of the sensor 214 in a manner similar to that already described with reference to the connection between the parts 115, 119 shown in FIG. 2. The axially fixed cam disc 218 of the sensor 214 abuts at least the race 216a of an axially fixed antifriction ball bearing 216 between the gear 215 and the shaft A.

An annular chamber 209 wherein the fluid pressure determines the frictional force between the conical surface of the flange 201a and the adjacent portion of the endless chain (not shown in FIG. 3) is bounded in part by the flange 201a and in part by an annular member 224 which is rigidly secured to the shaft A. The pressure of fluid in the chamber 209 is determined by the sensor 214. The pressure of fluid in an annular chamber 212 determines the ratio of the transmission including the parts A and 201a of FIG. 3. The pressure of fluid in the chamber 212 is also determined by the sensor 214. The chamber 212 is bounded in part by the flange 201a, in part by the shaft A, and in part by the member 214. In contrast to the designs of the previously described transmissions (shown in FIGS. 1, 1a and 2, respectively), the chamber 209 is located radially outwardly of the chamber 212.

The sensor 214 is provided with two annular chambers 222 and 223. The fluid in the chamber 222 is always pressurized when the sensor 214 is in the process of transmitting torque between the gear 215 and the axially movable flange 201a; this chamber is defined by annular members 218 (cam disc) and 224 which are non-rotatably affixed to the shaft A, as well as by an annular member 225 which is disposed between the members 218, 224 and is rotatable on the shaft A. The member 225 forms part of or constitutes the cam disc 219 of the sensor 214. The members 218, 224 and 225 have portions which extend axially of the shaft A and are interfitted with each other to define the chambers 222 and 223, Sealing rings (shown but not referenced in FIG. 3) are interposed between certain interfitted portions of the members 218, 224 and 225.

The chamber 222 includes two compartments 222a, 222b which can communicate with each other by way of an axially parallel passage in the form of a bore 225a provided in the member 225. The compartment 222b is bounded in part by the annular member 225 (i.e., by the cam disc 219) and in part by the cam disc 218. On the other hand, the compartment 222a is disposed axially between the annular member 224 and the axially movable cam disc 219. Otherwise stated, the compartments 222a and 222b are provided at opposite sides of the axially movable cam disc 219.

The radially effective surface of the body of fluid in the compartment 222a is greater than that of the body of fluid in the compartment 222b. Such differential between the effective surfaces causes the fluid to exert upon the cam disc 219 a force acting in the axial direction of the shaft A and causing the cam disc 219 to bias the spherical spreading elements 220 against the adjacent side or surface of the cam disc 218.

The throttle valve 270 which is shown in FIG. 3 serves to determine the fluid pressure at least in the chamber 222 in dependency at least upon the magnitude of the torque being transmitted by the sensor 214. This valve comprises a male valving element in the form of a projection or stud 271 provided on the annular member 224 (i.e., on the shaft A) and being held against axial movement relative to the shaft A, and a passage or bore 272 which is provided in the axially movable cam disc 219. The bore 272 communicates with the compartment 222b. A radially inwardly extending fluid discharging bore or passage 273 in the radially innermost portion of the cam disc 219 communicates with the bore 272. The rate of fluid flow from the bore 272 into the bore 273 is determined by the axial position of the cam disc 219 relative to the pin 271, i.e., by the magnitude of the torque being transmitted by the sensor 214. The rate of fluid flow into the bore 273 (i.e., from the compartment 222b) decreases in response to an increase of the magnitude of transmitted torque. Thus, the chamber 222 accumulates a fluid (oil) cushion serving to exert upon the cam disc 219 (and hence upon the spherical spreading elements 220) an axial force which is required for proper transmission of the selected torque.

A further channel or bore 240 is provided in the annular member 224 to establish communication between the chamber 209 of the cylinder-and-piston unit 204 and the chamber 222.

The right-hand end portion (as seen in FIG. 3) of the pin 271 is attached to the annular member 224 in such a way that the pin is held against axial movement relative to the member 224 but has some freedom of radial movement. This facilitates the introduction of the pin 271 into the bore 272 during assembly of the sensor 214 and the valve 270, i.e., a satisfactory centering of the pin so that the latter is less likely to jam in the bore 272 in actual use of the throttle valve 270.

The right-hand end portion of the pin 271 is provided with a head 271a which is urged against an external shoulder of a ring 275 affixed to the shaft A and/or to the member 224. A diaphragm spring 274 is provided to urge the head 271a against such shoulder. The bias of the diaphragm spring 274 is further effective to prevent or to oppose undesirable radial movements of the pin 271 but to permit necessary radial adjustments which are needed to properly center the pin 271 in the bore 272.

The means for establishing or preventing communication between the chambers 222 and 223 includes an eccentrically mounted switchover valve 276 including a body or housing 277 and a plunger 278 which is axially movably mounted in the body. The plunger 278 is fixedly secured to the axially movable flange 201a of the sheave, and the body 277 of the valve 276 is provided on the annular member 224 which is affixed to the shaft A. When the flange 201a assumes the axial position which is shown in the upper half of FIG. 3 (i.e., when the RPM of the non-illustrated second sheave is relatively low), the pressure in the chamber 223 is low because the valve 276 establishes communication between the channels 255, 260; such communication is established by way of two radial ports 256, 257 provided in the body 277 of the valve 276. The port 256 communicates with the channel 255 and the port 257 communicates with the channel 260; the head 278a of the plunger 278 is held (by the flange 201a) in such axial position relative to the valve body 277 that the ports 256, 257 (and hence the channels 255, 260) are free to communicate with each other.

When the flange 201a is moved axially to the other end position which is shown in the lower half of FIG. 3, i.e., when the plunger 278 is caused to move from the position shown in FIG. 3 in a direction to the right, a first or relatively early stage of such movement of the piston or plunger 278 involves a movement of the head 278a along the port 256 to thus interrupt the path for the flow of fluid between the channels 255 and 256. As the flange 201a continues its movement to the right, the head 278a of the plunger 278 gradually exposes the port 256; however, at such time, the head 278a is located between the ports 256, 257 so that the channels 255, 260 continue to be sealed from each other. In other words, the channel 260 cannot receive fluid (oil) from the chamber 223.

When the head 278a of the plunger 278 assumes an axial position in which the fluid can flow through the port 256, the chamber 223 is free to communicate with the chamber 209 by way of a channel 258 which then establishes a path for the flow of fluid to or from the channel 255 by way of the port 256 and the interior of the valve body 277. Thus, the pressure of fluid in the chamber 223 then matches or at least closely approximates that of the fluid in the chamber 222.

As already mentioned above, the channel 240 of the member 224 establishes a direct path for the flow of fluid between the chambers 209 and 222. On the other hand, the pressure of fluid in the chamber 222 is communicated to the body of fluid in the chamber 223 by way of the chamber 209. The sensor 214 serves as a means for establishing a portion of the path for the flow of fluid into the chamber 209 of the cylinder-and-piston unit 204.

Figures 3A, 3B, 4A, 4B:
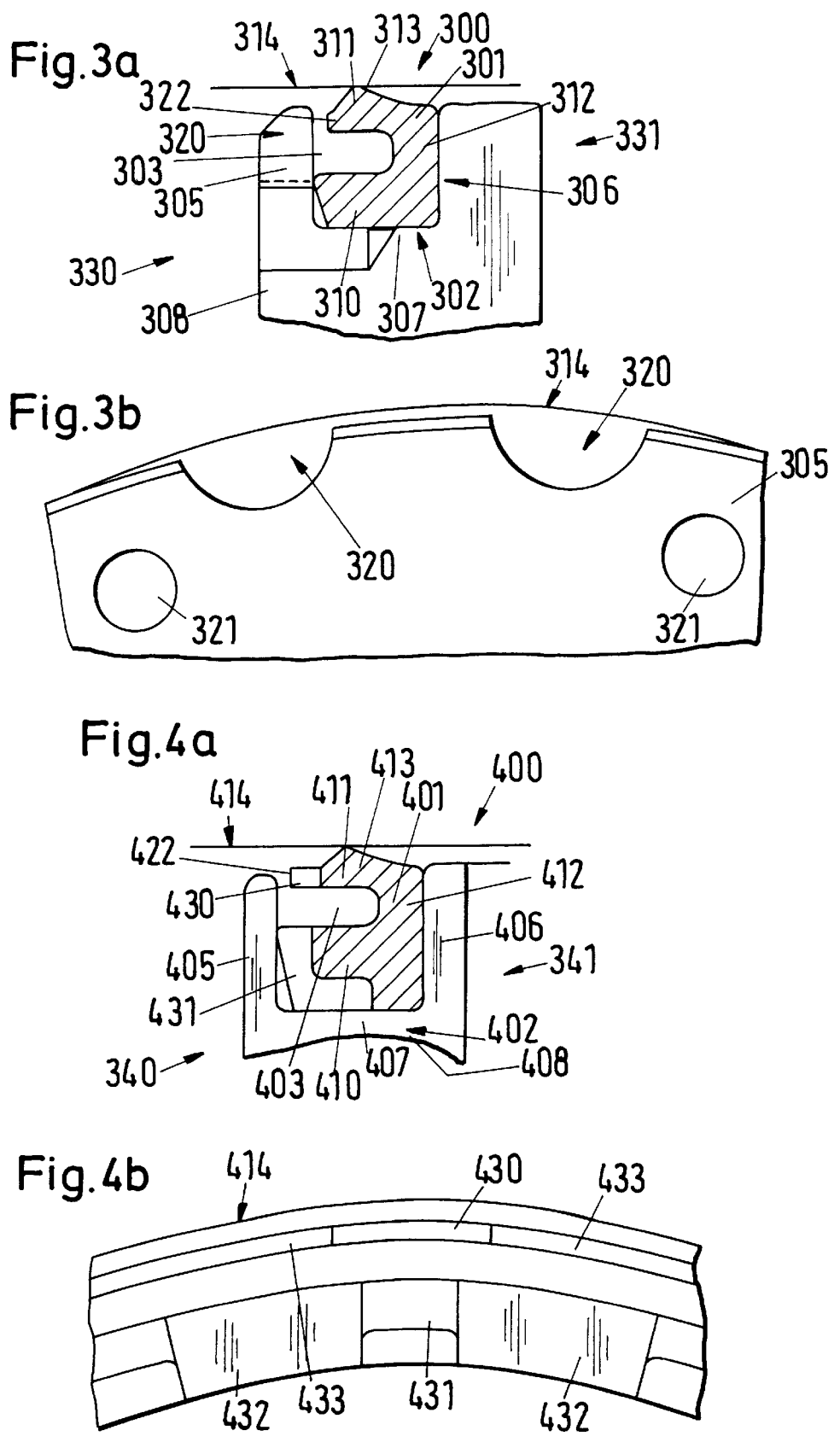

FIG. 3a illustrates a portion of a continuously variable speed transmission 300 including means for regulating the flow of fluid between at least two chambers, such as or corresponding to the chambers 22, 23 in the torque sensor 14 of FIGS. 1 and 1a. The regulating means comprises at least one annular sealing device 301 (only one such device is shown in FIG. 3a) which can replace the lip seal 67 shown in FIGS. 1, 1a, 1b and 1c. FIG. 3a shows a first plenum chamber 330 at one side, and a second plenum chamber 331 at the other side of the sealing device 301. The regulating means further comprises a housing 308 defining a space for the sealing device 301 (hereinafter called seal for short). The space preferably resembles or constitutes an annular recess or groove 302 and is bounded by the walls 305, 306 and 307 of the housing. The walls 305, 306 extend radially of the axis of the seal 301 and the wall 307 extends in the direction of such axis radially inwardly of the seal and between the walls 305, 306. The walls 305, 306, 307 are integral with each other, i.e., the housing 308 can constitute a one-piece annular member.

The seal 301 comprises a radially inner annular portion 310, a radially outer annular portion 311, and an annular intermediate portion 312 which connects one end of the portion 310 with one end of the portion 311. The portion 312 is located in a plane which is normal or substantially normal to the common axis of the portions, 310–312, and the portions 310, 311 are located at one side of such plane and extend in the direction of the aforementioned common axis.

The seal 301 is made of a flexible but highly wear-resistant material and the radially outer side of the annular outer portion 311 is provided with a circumferentially extending sealing lip 313. For example, the seal can constitute an annular body which is made of a suitable plastic material in an injection molding or other suitable machine, and the radially outer portion 311 can be provided with the lip 313 during the making of the seal in such machine. However, it is also possible to produce the lip 313 as a separate part which is then bonded or otherwise reliably and sealingly secured to the portion 311.

The lip 313 sealingly engages (or can sealingly engage) the cylindrical internal surface of a member or wall 314 (e.g., a member corresponding to the member 25 shown in FIGS. 1 and 1a or to the member 202 shown in FIGS. 1b and 1c). This lip can be located exactly or at least substantially centrally between the ends of the external surface of the member 311 as seen in the axial direction of the seal 301. The illustrated lip 313 has a substantially triangular cross-sectional outline and its apex which contacts the internal surface of the member 314 is or can be rounded.

The radially inner and radially outer annular portions 310, 311 of he seal 301 define an annular recess 303 which is adjacent the left-hand side of the intermediate portion 312 (as viewed in FIG. 3a). When the pressure of fluid in the chamber 330 (and hence also in the recess 303) is higher than the pressure of fluid in the chamber 331, the radially outer portion 311 tends to flex radially outwardly so that the reliability of sealing engagement between the rounded tip of the lip 313 and the adjacent portion of the internal surface of the member 314 increases. Such deformation of the elastically deformable seal 301 (and more specifically of its radially outer portion 311) results in the establishment of larger-area contact between the lip 313 and the member 314.

On the other hand, when the pressure in the chamber 331 rises above that in the chamber 330, the fluid filling the chamber 331 acts upon the right-hand portion of the external surface of the portion 311 and upon the respective side of the lip 313 with the result that the force with which the tip of the lip 313 bears upon the internal surface of the member 314 is reduced to an extent which is a function of the prevailing difference between the pressures of bodies of fluid in the chambers 330 and 331. If the pressure differential is sufficiently pronounced, the fluid filling the chamber 331 can actually move the lip 313 away from direct contact with the internal surface of the member 314. It will be seen that the seal 301, its receptacle 308 and the member 314 act as a check (one-way) valve.

The wall 305 of the receptacle 308 is provided with substantially semicylindrical recesses or cutouts 320 (see also FIG. 3b) and with circular openings 321 in the form of holes or bores which are located radially inwardly of the recesses 320. The purpose of the recesses 320 is to ensure that, when necessary, fluid can flow between the chambers 330, 331 even if the circumferentially extending free edge 322 of the radially outer annular portion 311 happens to abut and bear upon the adjacent side of the wall 305. In other words, the cutouts or recesses 320 ensure that the fluid can flow between the chambers 330, 331 when the lip 313 is disengaged from the internal surface of the member 314 regardless of whether or not the edge 322 of the annular portion 311 abuts the wall 305. The dimensions of the cutouts 320 should be selected in such a way that the adjacent parts of the annular portion 311 can undergo at least some deformation to even more reliably ensure the flow of fluid between the chambers 330, 331 at a rate which is required for satisfactory operation of the sensor.

The purpose of the openings 321 is to ensure the establishment of paths for the flow of a fluid between the chambers 330, 331 in the event of a misorientation (such as tilting) of the seal 301 in its recess 302. These openings need not necessarily be circular (or all of the openings need not be circular), and they can be formed by stamping, in a drilling machine or in any other suitable manner. For example, a tilting of the seal 301 can result in a movement of the radially inner annular portion 310 from sealing engagement with the adjacent surface of the wall 307 (at the bottom of the recess 302) so that the fluid can flow from one of the chambers 330, 331, radially inwardly of the tilted or otherwise misoriented or misaligned seal 301, through some or all of the openings 321 and into the other chamber.

The recesses 320 and/or the openings 321 may but need not be equidistant from each other, as seen in the circumferential direction of the wall 305. Furthermore, the number of recesses may but need not match the number of openings, and all of the openings need not be provided at the same radial distance from the periphery of the wall 305.

FIGS. 4a, 4b and 4c show the details of a modified regulating means or check valve including a sealing device (hereinafter seal) 401, a receptacle 408, and an annular member 414. This valve is installed in a continuously variable speed transmission 400, e.g., in lieu of the valve including the seal 67 shown in FIGS. 1 to 1c. The seal 401 is installed in an annular recess 402 of the receptacle 408, and the later comprises the walls 405, 406 and 407. The walls 405, 406 flank the seal 401 and extend substantially radially of common axis of the portions 410, 411 and 412 of the seal. The wall 407 is located radially inwardly of the portion 410. The purpose of the seal 401 is to to prevent (when necessary) the flow of fluid between the plenum chambers 340 and 341. The radially outer annular portion 411 of the seal 401 has a circumferentially extending lip 413 which engages or can engage the cylindrical internal surface of the annular member 414.

The wall 407 may but need not extend exactly in the axial direction of the seal 401. The receptacle 408 my but need not constitute a one-piece annular part. For example, such receptacle may be assembled of two or more interconnected components one of which includes the wall 405 and another of which includes the walls 406, 407. At least one of the walls (such as the wall 405) can constitute an annular member which is affixed to the wall 406 by the wall 407 and/or otherwise.

The seal 401 is preferably made of a flexible and highly wear-resistant material, e.g., a rubber mixture such as that known as "VITON" (trademark). The dimensions of the seal 401 and the positioning of the recess 402 relative to the internal surface of the annular member 414 are preferably such that the lip 413 (which is or can be designed and positioned in the same way as the aforedescribed lip 313) stores at least some energy, i.e., the seal 401 is preferably installed in a prestressed condition.

The free edge (namely that edge which is remote from the radially extending intermediate portion 412) of the radially inner portion 410 and/or the radially outer portion 411 of the seal 401 is provided with reliefs. FIGS. 4a, 4b and 4c show reliefs 430 in the free edge 422 of the radially outer portion 411 and reliefs 431 in the free edge of the radially inner portion 410. The reliefs 430 and/or 431 can have a rectangular or square cross-sectional outline. As can be readily seen in FIG. 4b, the reliefs 430 of the portion 411 have a rectangular cross-sectional outline. On the other hand, and as can be seen in FIGS. 4a and 4c, the reliefs 431 of the portion 410 have a substantially L-shaped cross-sectional outline.

The reliefs 430 and 431 ensure that the respective annular portions 411, 410 of the seal 401 are provided with burls, knobs or otherwise configured projections or protuberances which project from the deepmost zones of the reliefs and permit streams of fluid to flow therethrough even if the projecting parts of the portion or portions 410, 411 abut the adjacent wall or walls of the receptacle 408. The reliefs 430 are preferably provided adjacent to the lip 413 (see FIGS. 4a and 4c), i.e., they do not extend into the lip so that they do not affect the quality of sealing action between the lip 413 and the internal surface of the member 414. Portions of at least some of the reliefs 430, 431 can extend axially and/or radially of the seal 401.

The reliefs 430 alternate with flat arcuate portions 433 of the free edge 422 of the radially outer annular portion 411, and the reliefs 431 alternate with non-profiled portions 432 of the free edge of the radially inner annular portion 410. The reliefs 430 can be utilized in addition to or in lieu of the cutouts 320 shown in FIG. 3b, i.e., they also ensure that a desired amount of fluid can flow into and from the recess 403 and against the left-hand side of the lip 413 (as viewed in FIG. 4a or 4c) regardless of whether or not the edge 422 abuts the adjacent wall 405. Such fluid can flow from the chamber 340 into the chamber 341 or in the opposite direction as soon as the lip 413 is caused to become disengaged from the internal surface of the member 414.

The reliefs 431 in the free edge of the radially inner portion 410 of the seal 401 can perform the function of the aforediscussed openings 321, i.e., such reliefs are or can be particularly effective in the event of a tilting or other departure from optimum orientation of the seal 401 relative to the surfaces bounding the recess 402 of the receptacle 408. In other words, the reliefs 431 permit the fluid to flow between the chambers 340, 341 radially inwardly of the improperly oriented seal 401.

At least one of the annular portions 410, 411 can be provided with a single relief 431 or 430. As a rule, at least one of the portions 410, 411 will be provided with a plurality of preferably equidistant reliefs (as seen in the circumferential direction of the seal 401).

The dimensions of the reliefs 430 and/or 431 may but need not be the same, and each of the annular portions 410, 411 can be provided with identical, similar or dissimilar reliefs.

It is presently preferred to distribute the recesses 320 and/or the openings 321 in the wall 305 of FIG. 3b in such a way that they are respectively equidistant from each other as seen in the circumferential direction of the receptacle 308. However, and as already mentioned above, it is equally possible to arrange the recesses 320 and/or the openings 321 in random distribution and in such a way that they are provided only in a selected portion of the wall 305 such as along one or more arcs of, for example, 90° each. All of the above applies with equal force for the number, distribution and grouping of the reliefs 430 and/or 431.

Figure 5:
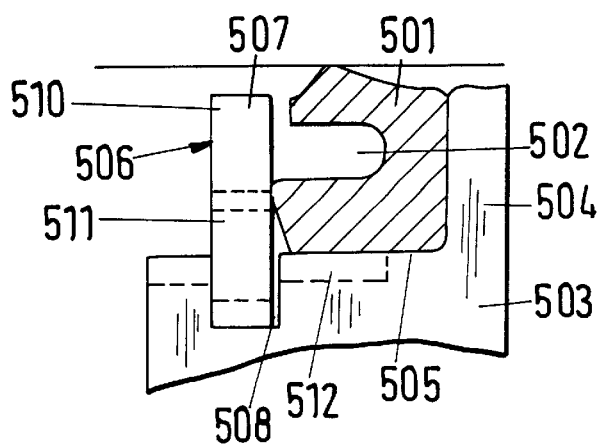
FIG. 5 is a fragmentary axial sectional view similar to that of FIG. 3a or 4a but showing a further sealing device and a receptacle therefor.

FIG. 5 shows a portion of a regulating means constituting a modification of the regulating means shown in FIGS. 3a and 3b. The difference is that the recepacle 503 which defines a groove 502 for the seal 501 includes two components, The component 506 corresponds to the wall 305, and the second component consists of the walls 504, 505 respectively corresponding to the walls 306, 307. The component including the walls 504, 505 has a radially extending recess 508 for the radially inner portion of the component or wall 506. The latter has recesses 510 (corresponding to the recesses 320) and openings 511 (corresponding to the openings 321). In the event of a tilting of the seal 501, fluid can flow between the two compartments (not referenced in FIG. 5) through the openings 511 of the component or wall 506 and one or more cutouts or bores or grooves 512 in the wall 505 adjacent the radially inner annular portion of the seal 501.

The manner in which the radially inner portion of the component or wall 506 is secured in the recess 508 of the other component including the walls 504 and 505 is not shown in FIG. 5; for example, the component 506 can be a force fit in the recess 508 or it can be welded (or otherwise bonded) or mechanicallly affixed (e.g., by rivets or screws) to the other component.

Figure 6:
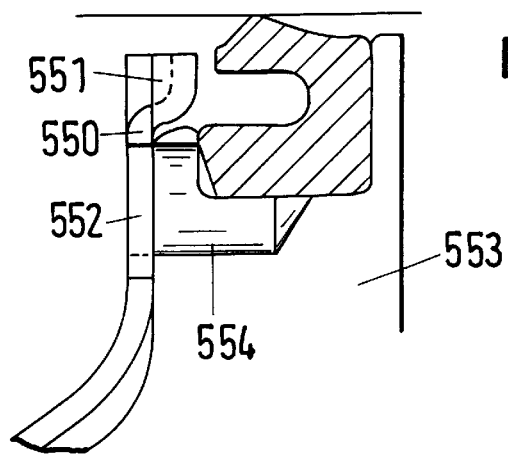
FIG. 6 is a view similar to that of FIG. 5 but showing an additional sealing device and a receptacle therefor.

FIG. 6 shows a modification of the structure which is illustrated in FIG. 5. The component or wall 506 is replaced with a component or wall 550 which is made of sheet metal and is provided with cutouts 551 (corresponding to the cutouts 320 or 510) and openings 552 (corresponding to the openings 321 or 511). The other component 553 comprises two integral walls corresponding to the walls 504, 505 and has one or more bores, recesses or grooves 554 corresponding to the groove or grooves 512. The component or wall 550 can be riveted or otherwise fixedly secured to the component 553. The seal of FIG. 6 can be identical with the seal 501 of FIG. 5.

Figure 7:
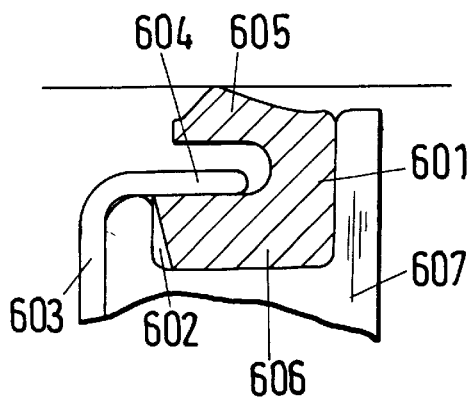
FIG. 7 is a view similar to that of FIG. 6 but showing still another sealing device and a receptacle therefor.

FIG. 7 shows a portion of a retaining means wherein the receptacle 607 defines a recess or groove 602 for a seal 601 having a radially outer annular portion provided with a sealing lip 605. The means for confining the seal 601 in the recess 602 is shown at 603; such confining means comprises at least one suitably bent arm 604 which extends into an annular groove or recess between the radially inner and radially outer annular portions 606, 605 and at one side of the annular intermediate portion of the seal 601. The confining means 603 can constitute a circumferentially complete annulus which is affixed to the receptacle 607. The arm 604 can be a complete ring or it can consist of two or more arcuate sections distributed in the circumferential direction of the seal 601.

Figure 8:
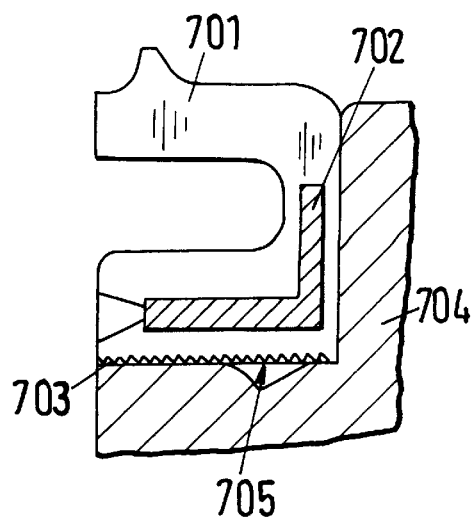
FIG. 8 is a view similar to that of FIG. 7 but showing still another (composite) sealing device and a receptacle therefor.

FIG. 8 shows a further regulating means including a receptacle 704 having a recess 705 for a seal 701. The latter comprises an elastically deformable first or main annular section and a non-elastic second annular section 702 which is at least substantially embedded in the first annular section. For example, the section 702 can constitute or include a metallic ring having a substantially L-shaped cross-sectional outline. The radially inner side of the seal 701 can be toothed or otherwise serrated (as at 703); this is intended to ensure a more reliable retention of the seal 701 in the recess 705 (as seen in the axial direction of the seal). The teeth or serrations 703 can mate with complementary serrations in the adjacent surface bounding the respective portion of the recess 705. The serrations 703 may but need not extend circumferentially along the entire radially inner surface of the seal 701. The latter can be provided with a lip (shown but not referenced) corresponding, for example, to the lip 313 of FIG. 3a.

It is further within the purview of the invention to provide at least one of the radially inner and radially outer portions of a seal (such as the portion 67a and/or 67b of the seal 67 shown in FIGS. 1b and 1c) with round, oval and/or polygonal (such as square, rectangular, hexagonal, etc.) reliefs. Furthermore, at least some of the reliefs can be surrounded by or confined within an edge of the respective annular portion of the seal. As already mentioned hereinbefore, the radially inner and/or the radially outer annular portion of a seal can be provided with a plurality of equally or unequally spaced-apart reliefs, for example, with an annulus of between 5 and 40 (preferably between 20 and 30, and in certain instances most preferably 24) uniformly spaced-apart reliefs.

It is also possible to employ the improved seal with one or two sets of reliefs in adjusting means for the axially movable flanges of sheaves in the improved continuously variable speed transmission.

The features of two or more of the aforedescribed and illustrated fluid flow regulating means can be utilized independently of or in combination with each other. By way of example only, a composite seal of the type shown at 701 in FIG. 8 can be provided with reliefs of the type shown in FIG. 4a, a confining means of the type shown at 603 in FIG. 7 can be utilized in conjunction with a seal of the type shown at 401 in FIG. 4a, and so forth. Still further, the seal can be made of any one of a variety of materials which exhibit the required resiliency and resistance to wear and can be readily processed to exhibit the aforediscussed configurations, reliefs and other advantages.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of sealing devices for use in continuously variable speed transmissions and, therefore, such adaptations should and are intended to be comprehended within the meaning and range of equivalence of the appended claims.

What is claimed is:

1. A transmission comprising a first adjustable rotary sheave including coaxial first and second flanges, one of said flanges being movable axially toward and away from the other of said flanges; a second adjustable rotary sheave including coaxial first and second flanges, one flange of said second sheave being movable axially toward and away from the other flange of said second sheave; at least one endless flexible torque transmitting element trained over said sheaves; a source of pressurized fluid; means for adjusting said first and second flanges of each of said first and second adjustable rotary sheaves; said adjusting means having at least two fluid receiving chambers and means for connecting at least one of said chambers to said source; and means for regulating the flow of fluid between said at least two chambers, including at least one annular sealing device; wherein said at least one annular sealing device has an annularly radially outer portion, an annular radially inner portion, and an annular intermediate portion disposed between and connecting said radially inner and radially outer portions with each other; wherein said radially inner and radially outer portions of said at least one sealing device extend in the direction of a common axis of said portions and said intermediate portion extends substantially radially of said common axis and wherein at least one of said radially inner and radially outer portions of said at least one sealing device has a plurality of reliefs spaced apart from each other in a circumferential direction of the respective one of said radially inner and radially outer portions.

2. The transmission of claim 1, wherein said intermediate portion of said at least one sealing device is located in a plane which is at least substantially normal to said common axis, and at least a major part of each of said radially inner and radially outer portions is located at one side of said plane.

3. The transmission of claim 1, wherein each of said radially inner and radially outer portions of said at least one sealing device has a plurality of reliefs spaced apart from each other in a circumferential direction of said at least one of said radially inner and radially outer portions.

4. The transmission of claim 1, wherein at least one of said reliefs has a substantially rectangular cross-sectional outline.

5. The transmission of claim 1, wherein at least one of said reliefs has a substantially square cross-sectional outline.

6. The transmission of claim 1, wherein at least one of said reliefs has a substantially L-shaped cross-sectional outline.

7. The transmission of claim 1, wherein said at least one of said radially inner and radially outer portions of said at least one sealing device has between about 5 and 40 reliefs.

8. The transmission of claim 1, wherein said at least one of said radially inner and radially outer portions of said at least one sealing device has between about 20 and 30 reliefs.

9. The transmission of claim 1, wherein said at least one of said radially inner and radially outer portions of said at least one sealing device has at least close to 24 reliefs.

10. The transmission of claim 1, wherein said reliefs are at least substantially equidistant from each other as seen in said circumferential direction of said at least one of said radially inner and radially outer portions of said at least one sealing device.

11. The transmission of claim 1, wherein said regulating means further comprises a receptacle having an annular recess for said at least one annular sealing device and including spaced-apart first and second walls extending at least substantially radially of a common axis of said portions of said at least one sealing device, said receptacle further including a third wall located radially inwardly of said radially inner portion of said at least one sealing device.

12. The transmission of claim 11, wherein at least one of said first and second walls has a plurality of openings and/or a plurality of recesses.

13. The transmission of claim 12, wherein at least two of said walls of said receptacle are of one piece with each other.

14. The transmission of claim 12, wherein said receptacle comprises a plurality of interconnected components including a first component embodying one of said walls and at least one second component embodying the others of said walls.

15. The transmission of claim 14, wherein said first component includes a ring and said one wall which is embodied by said first component has said openings and/or recesses.

16. The transmission of claim 15, wherein said at least one second component has openings and/or recesses in communication with the openings and/or recesses of said one wall which is embodied by said first component.

17. The transmission of claim 1, wherein said at least one annular sealing device includes an elastically deformable first annular section and a non-elastic second annular section at least partially confined in said first annular section.

18. The transmission of claim 1, wherein said regulating means further comprises a receptacle for a portion of said at least one sealing device, and means for confining said at least one sealing device in said receptacle.

19. The transmission of claim 18, wherein said at least one annular sealing device has an annular radially outer portion, an annular radially inner portion and an annular intermediate portion disposed between and connecting said radially inner and radially outer portions with each other, said annular radially inner and outer portions of said at least one sealing device having a common axis and said confining means comprising at least one arm extending in the direction of said common axis into an annular recess adjacent said intermediate portion and disposed between said radially inner and radially outer portions of said at least one sealing device.

20. The transmission of claim 1, wherein said adjusting means is arranged to move said one flange of one of said sheaves axially of the other flange of said one sheave.

21. The transmission of claim 1, wherein said adjusting means includes means for urging the flanges of one of said sheaves against said at least one endless flexible element with a variable force.

22. The transmission of claim 1, further comprising means for transmitting to one of said sheaves a variable torque and means for monitoring the magnitude of said variable torque, said adjusting means being associated with said monitoring means.

23. The transmission of claim 1, further comprising means for transmitting to one of said sheaves a variable torque and means for monitoring the magnitude of said variable torque, said chambers being provided in said monitoring means.

* * * * *